(12) United States Patent
Reutlinger

(10) Patent No.: US 6,433,518 B1
(45) Date of Patent: Aug. 13, 2002

(54) DEVICE FOR REGULATING A GENERATOR WITH A DEDICATED VOLTAGE TRANSFORMER

(75) Inventor: Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,200

(22) PCT Filed: Oct. 26, 1999

(86) PCT No.: PCT/DE99/03408

§ 371 (c)(1),
(2), (4) Date: Sep. 27, 2000

(87) PCT Pub. No.: WO00/45497

PCT Pub. Date: Aug. 3, 2000

(30) Foreign Application Priority Data

Jan. 29, 1999 (DE) .......................... 199 03 426

(51) Int. Cl.⁷ ................................. H02P 9/00
(52) U.S. Cl. ............................. 322/28; 322/25
(58) Field of Search ............... 322/7, 24, 25, 322/27, 28, 29, 20; 363/1, 10

(56) References Cited

U.S. PATENT DOCUMENTS

| | | | | |
|---|---|---|---|---|
| 4,827,393 A | * | 5/1989 | Clark | 322/28 |
| 5,280,419 A | * | 1/1994 | Amler | 318/811 |
| 5,502,368 A | * | 3/1996 | Syverson et al. | 310/181 |
| 5,550,457 A | * | 8/1996 | Kusase et al. | 322/28 |
| 5,703,410 A | * | 12/1997 | Maekawa | 123/339.16 |
| 5,929,612 A | * | 7/1999 | Eisenhaure et al. | 290/8 |
| 6,252,381 B1 | * | 6/2001 | Schenk | 322/20 |

FOREIGN PATENT DOCUMENTS

| | | |
|---|---|---|
| DE | 196 45 944 | 11/1996 |
| DE | 198 45 569 A | 4/1999 |
| EP | 0 401 758 A | 12/1990 |
| WO | 99 06241 A | 2/1999 |
| WO | 99 07056 A | 2/1999 |

* cited by examiner

Primary Examiner—Nicholas Ponomarenko
(74) Attorney, Agent, or Firm—Michael J. Striker

(57) ABSTRACT

Devices and methods for controlling a generator with an associated voltage converter that functions as a step-up converter are disclosed, in which the control of the generator is done as a function of its rpm and/or as a function of the rpm-dependent possible output voltage of the generator. Three different ranges are defined, in each of which different control actions are performed: at low rpm, a power control at the maximum allowable exciter current; at higher rpm levels, a voltage control by influencing the exciter current; and at an overvoltage at higher rpm and a sudden load reduction, a third control strategy, which reduces the overvoltage and the exciter current.

10 Claims, 3 Drawing Sheets

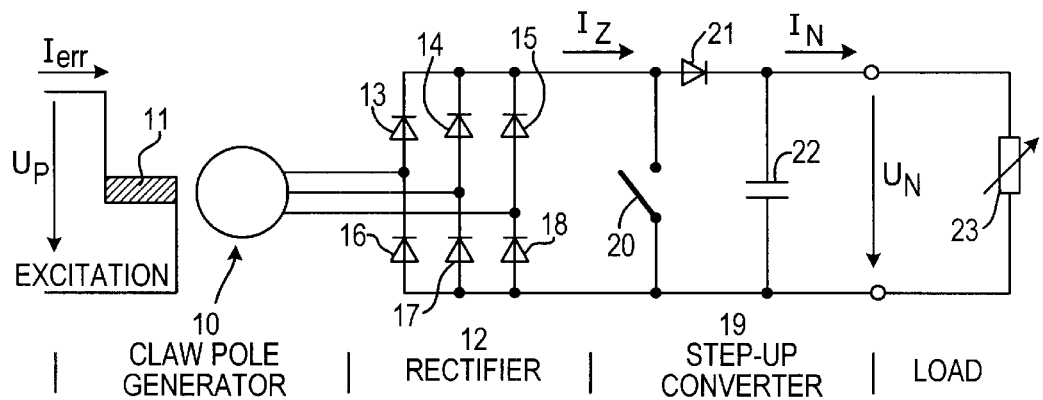
FIG. 1
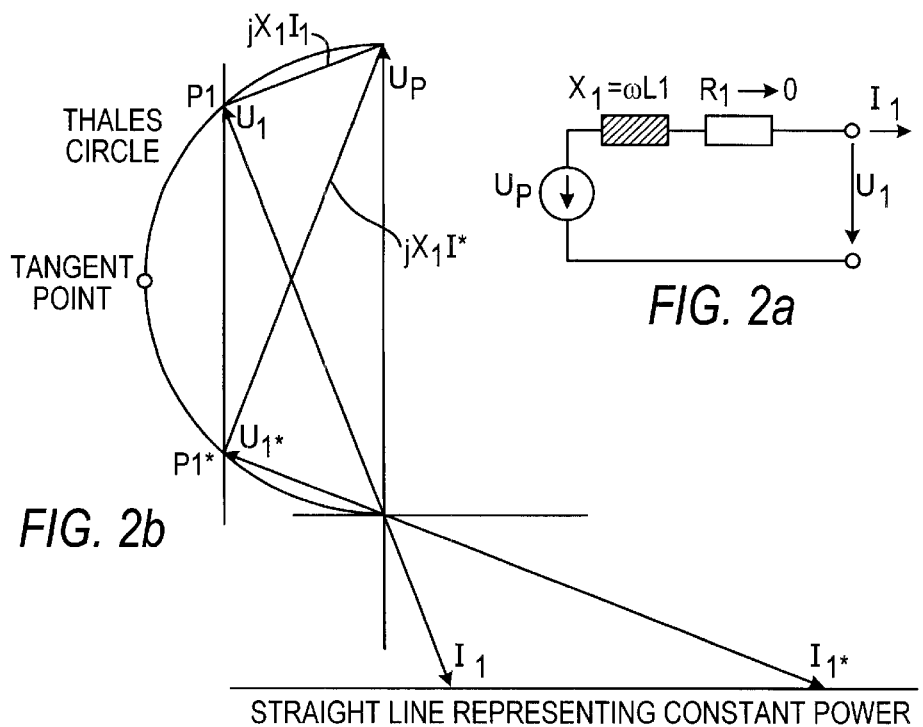
FIG. 2a
FIG. 2b

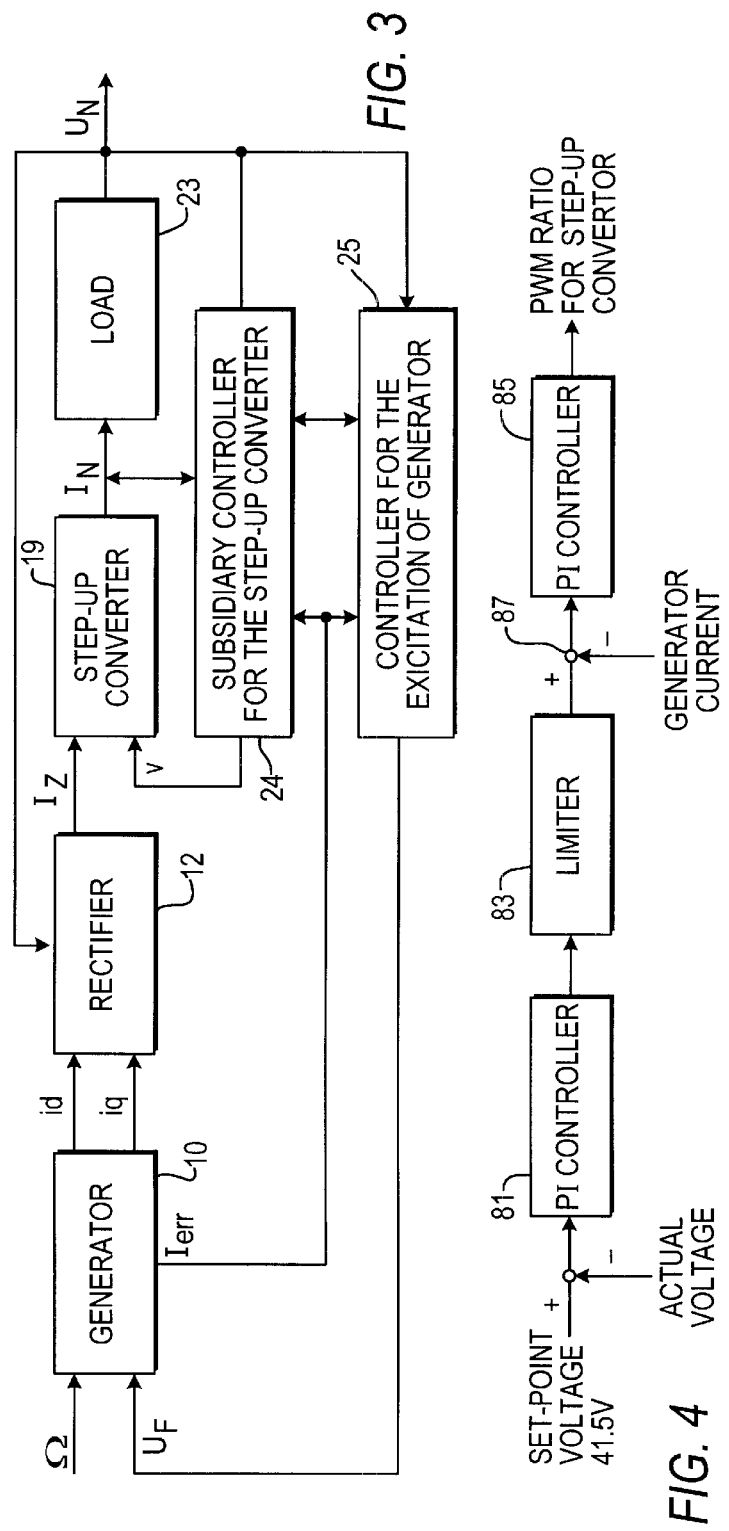
*FIG. 3*
*FIG. 4*
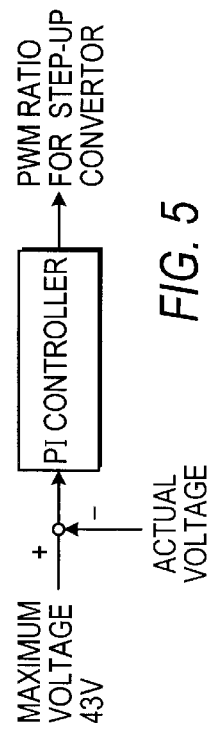
*FIG. 5*

DEVICE FOR REGULATING A GENERATOR WITH A DEDICATED VOLTAGE TRANSFORMER

BACKGROUND OF THE INVENTION

In motor vehicles, for supplying the electrical on-board system consumers, rotary current generators are employed, which are driven by the internal combustion engine. These rotary current generators, such as claw pole generators, are connected to the direct voltage on-board vehicle electrical system via a diode rectifier bridge. The voltage level to which the generator is controlled is at present approximately 14 V. The power output by the rotary current generators is controlled via the magnitude of the exciter current that flows through the exciter winding. As the controlled variable, the on-board electrical system voltage or the output voltage of the generator is typically used.

Since the electrical power consumption required in the vehicle electrical system is considerable and will increase still further in the future, it is presently already conventional to construct a vehicle electrical system as a dual-voltage vehicle electrical system, in which one voltage is then about 14 V and the other is about 42 V. Furnishing the higher voltage is done with the aid of a direct voltage converter, ground-connected to the generator, and this voltage converter acts as a step-up converter. A vehicle electrical system with at least one generator and one downstream direct voltage converter is known for instance from German Published, Unexamined Patent Application DE-OS 196 459 44. Both the controlling of the generator and the triggering of the direct voltage converter are done in this known on-board electrical system, with the aid of its own control unit, which processes the supplied information and outputs trigger pulses accordingly.

Another vehicle electrical system with a generator and a downstream step-up converter is known from German Patent DE-P 198 455 69. In this on-board electrical system, a claw pole generator is employed for supplying the on-board electrical system with 42 V. The generator terminals are connected, via a rotary current bridge rectifier, to an intermediate circuit, Connected downstream of it is a step-up converter for increasing the power of the generator. The power portion substantially comprises the generator. The output side of the generator supplies an intermediate circuit via a rotary current bridge rectifier. This intermediate circuit is connected to the on-board electrical system via the step-up converter. The step-up converter has no capacitive reactance of its own but instead uses the phase inductance of the generator as reactance. Thus this step-up converter makes do with a minimum number of components.

SUMMARY OF THE INVENTION

It is an object of the present invention to provide an improved method for optimal control of a generator with a voltage converter, especially for supplying electrical power in an on-board vehicle electrical system, of the above-described type, which makes the highest possible power output of the generator possible, even at low rpm.

It is another object of the present invention to provide an improved device for optimum control of a generator with a voltage converter, especially in an on-board vehicle electrical system, of the above-described type, which provides the highest possible power output, even at low rpm.

The method according to the invention for controlling a generator including an exciter coil and provided with an associated voltage converter operating as a step-up converter, includes the steps of:

a) performing a first control process for controlling the generator when an output voltage of the generator is below a normal operating voltage range, the first control process comprising increasing an exciter current flowing through the exciter coil until the output voltage is in the normal operating voltage range or increasing the exciter current until the exciter current reaches a maximum current value and then increasing the output voltage with the help of the step-up converter until the output voltage is in the normal operating voltage range, so that an output power of the generator is maximum;

b) performing a second control process for controlling the generator when the output voltage is within the normal operating voltage range, the second control process comprising clocking the exciter current to regulate the output power of the generator; and c) performing a third control process for controlling the generator when the output voltage exceeds the normal operating voltage range, the third control process comprising limiting the output voltage by means of a P controller via the step-up converter in response to an overvoltage condition. The device according to the invention for controlling a generator including an exciter coil and supplying a load includes a voltage converter for converting generator output voltage connected with the generator, the voltage converter operating as a step-up converter;

a controller for controlling an exciter current flowing through the exciter coil of the generator;

a subsidiary controller for controlling the step-up converter;

wherein the subsidiary controller and the controller for controlling an exciter current are connected with each other for exchange of information and either the subsidiary controller or the controller for controlling the exciter current acts to control the output voltage of the generator according to a value of the output voltage.

The device and method according to the invention for controlling a generator with an associated voltage converter have the advantage that a power output of the generator is possible even at rpm levels at which the output voltage of the generator would not yet suffice to supply the on-board electrical system directly. It is also advantageous that at rpm levels that cause higher output voltages of the generator, a control can be performed that makes a maximum power output possible.

Advantageously, by means of the voltage converter acting as a step-up converter, the generator voltage is freely adjusted, depending on the required value, between zero and the desired maximum value, which for instance is 42 V. By this voltage adjustment it is possible to operate the generator at a point of maximum power output, even in the lower rpm range. This maximum output, also called the tangent output, is only a function of the rpm for a given generator and maximum excitation. At higher rpm levels, the step-up converter can no longer be used to increase the power; then the generator is advantageously controlled in its output power via the exciter current. At higher rpm levels, the same control strategy for the generator as is currently conventional for present generators is thus advantageously employed.

To protect against overvoitages, the step-up converter itself is advantageously used, By closure of the switch or switches of the step-up converter at overvoltages, the power output of the generator to the electrical system can advantageously be prevented. Thus the overvoltages and in particular the duration of the overvoltages after a load dump can be reduced. The Zener diodes that are currently usual in the rectifier bridge can then be replaced by conventional diodes. This is especially advantageous since at the higher voltage levels of up to 42 V, for which the generator is designed, there are presently no suitable Zener diodes available.

In preferred embodiments of the device and method according to the invention the step-up controller comprises means for controlling the terminal voltage of the generator by changing a duty factor of the step-up converter, which determines a ratio of voltage at an output of the step-up converter to voltage at an input of the step-up converter.

In preferred embodiments of the device according to the invention the subsidiary controller includes a P controller that rapidly responds to overvoltage and signals the step-up controller to limit generator output voltage.

BRIEF DESCRIPTION OF THE DRAWING

The objects, features and advantages of the invention will now be illustrated in more detail with the aid of the following detailed description of the invention, with reference to the accompanying figures in which:

FIG. 1 is a schematic diagram of a claw pole generator with a step-up converter without the means for controlling the generator according to the invention;

FIG. 2a and FIG. 2b are, respectively, a substitute circuit diagram and pointer diagram of a simplified machine (generator);

FIG. 3 is a schematic diagram of the entire closed-loop control circuit for controlling generator voltage according to the invention;

FIG. 4 shows a part of a subsidiary controller for the step-up converter according to the invention;

FIG. 5 shows a part of a subsidiary controller for controlling the step-up converter to provide overvoltage protection according to the invention.

DETAILED DESCRIPTION OF THE INVENTION

Figure 6:
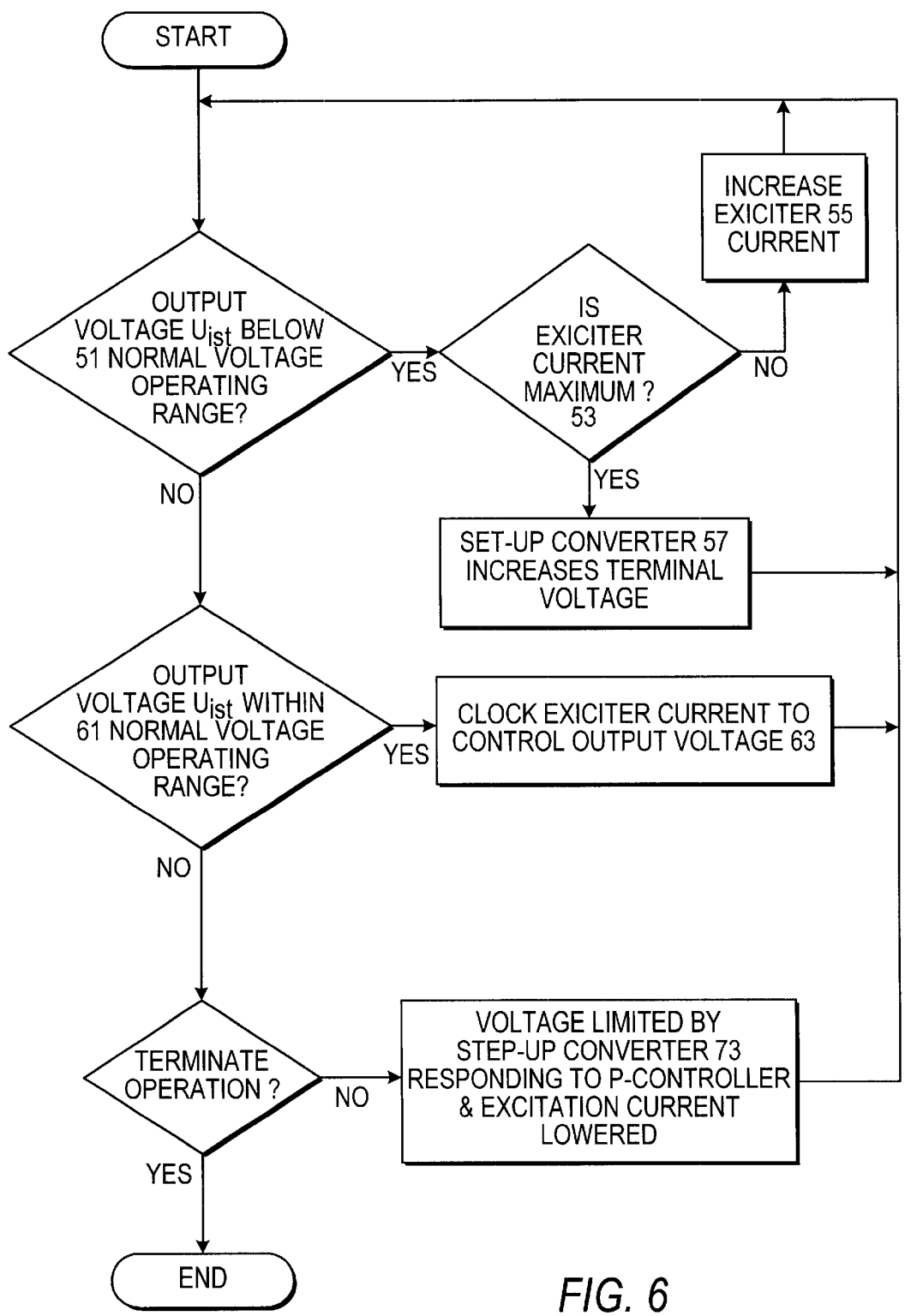
FIG. 6 is a flow chart of a preferred embodiment of a method for controlling generator voltage according to the invention.

In FIG. 1, a claw pole generator with a step-up converter is shown, for which the control according to the invention can be employed. Individually, reference numeral 10 designates the claw pole generator, and reference numeral 11 designates the exciter winding, through which the exciter current $I_{Err}$ flows. The stator windings and the voltage controller, which typically are connected to the generator, are not shown explicitly.

Adjoining the claw pole generator 10 is the rectifier bridge 12, which includes six diodes 13–18. The step-up converter 19 includes a switch 20, a diode 21, and a capacitor 22. The on-board electrical system is shown schematically in the form of a load 23. The current $I_2$ flows out of the rectifier, and the current $I_N$ flows into the vehicle electrical system. The voltage furnished for the electrical system is designated $U_N$.

1. Generator

If the magnetic monoaxial nature is ignored, then a very simple substitute circuit diagram and a simple pointer diagram as shown in FIGS. 2a and 2b result. For one output power P of the machine, two possible operating points exist. In the pointer diagram of the machine, the two possible operating points belonging to a specific power P are shown. The product of current times voltage is the same in both cases. One operating point P1 is distinguished by a high voltage and a low current, while the other operating point P1* is conversely distinguished by a low voltage and a high current.

For the case of maximum power output of the machine, both operating points coincide at the so-called tangent point. If $X_1 \gg R_1$, then $U_1 = 1\sqrt{2} \cdot U_p$.

The voltage drop at the phase inductance $X_1$=omega $L_1$ is then equal in magnitude to the terminal voltage $U_1$.

Thus the current at the tangent point is $U_1 = 1/\sqrt{2}$ Up/omega $L_1$.

If Up=1/√2 ·omega $L_{i,f} \cdot 1_{err}$, then this current is equal to $1_1 = \frac{1}{2} \cdot L_{1f}/L_1 \cdot 1_{err}$.

From this it can be seen that for a maximum power output, the current is independent of the rpm. It is a function only of the exciter current. The current for maximum power output can therefore be predetermined as a function of the exciter current, independently of the rpm, and is suitable for control to the tangent power.

2. Step-up converter

To enable drawing the maximum power of the machine at various rpm levels, the terminal voltage must be adjustable. The terminal voltage, however, is dependent on the pole wheel voltage of the machine, which in turn depends on the rpm and the exciter current. Thus the terminal voltage must therefore be made variable. This is done by the step-up converter. Via the duty factor V of the step-up converter, the ratio of the voltages at the converter input $U_z$ and the converter output $U_N$ (system voltage) is defined. The intermediate circuit voltage $U_Z$ is the output voltage of the generator after the rectification. The system voltage $U_N$ is present at the converter output, and the consumer and optionally a battery are connected to it. The output voltage of a step-up converter is always greater than or equal to the input voltage. At the converter output, a constant voltage of 42 V should exist, and thus the input voltage of the converter, or the, generator voltage, can be adjusted between $U_z=0$ V and 42 V by of the duty factor.

3. Control

For control, the machine offers two possibilities of intervention. First, the exciter current of the machine and thus the pole wheel voltage can be varied; second, the terminal voltage, or the intermediate circuit voltage, can be varied via the step-up converter. Both possibilities are meant to be used here. In FIG. 3, the structural diagram of the entire closed-loop control circuit is shown, with the subsidiary controller 24 for the step-up converter and the controller 25 for the excitation of the generator. The generator 10, the rectifier 12, the step-up converter 19 and the load 23 exchange the information shown in FIG. 3 with one another.

Power control in the lower rpm range:

In the lower rpm range, the machine is fully excited; the maximum allowable exciter current flows. The intermediate circuit voltage, however, is less than the system voltage. By means of the step-up converter, the power of the machine can now be adjusted to the desired output value. The output power is controlled via the duty factor. At maximum, it reaches the tangent power.

Voltage control at higher rpm levels (load-dump protection):

In the upper rpm range, use can be made of the possibility that two possible terminal voltages exist for each power level. If the machine is excited for a high power level and a load dump is taking place, then the terminal voltage increases abruptly. This increase in the system voltage cannot be brought under control by a rapid reduction in the exciter current, since the exciter current decreases only slowly because of the exciter inductance. However, the step-up converter can adjust the voltage value that pertains to the new, lower power level. This means that with the step-up converter, the terminal voltage at the generator is reduced from the previously existing natural terminal voltage ($U_2=U_{Netz}$) The terminal voltage reaches the value at which, with a still-unchanged exciter current, the power output to the system attains the new value.

PREFERRED CONTROL METHOD OF THE INVENTION

The preferred control method includes three different control processes for three output voltage ranges, in the flow chart in FIG. 6. It is therefore suitable to divide up the controller into three partial controllers operating according to the three different processes, as follows:

1. If $U_{ist}-U_{soll}-\Delta U_{min}$ (step 51): the step-up converter attempts to prop up the voltage. At the same time, the exciter current is increased. This operation is continued until the voltage has reached its set-point value by increasing the exciter current in step 55 of FIG. 6, or until the exciter current has reached its allowable maximum value in step 53. If the exciter current cannot be increased any further, since it is already reached the maximum allowable value, then the required power can be furnished via the step-up converter (step 57).

2. IF $U_{soll}-\Delta U_{min}<U_{ist}<U_{soll}+\Delta U_{max}$ (step 61): the generator is in its normal operating range. It is controlled in its output voltage or output power via the exciter current (as is also done in present controllers), according to step 63 of FIG. 6.

3. If $U_{ist}>U_{soll}+\Delta\omega U_{max}$ (step 73): overvoltage, for instance after a load clump. Since the exciter current cannot be reduced fast enough, the machine has to be "clocked down" via the step-up converter in step 73. At the same time, a reduction in the exciter current takes place (load dump protection).

Control of the step-up converter

A current controller for the generator current $I_2$ is subsidiary to the voltage control. At the same time, this voltage controller is limited to the current value at the tangent point. The limitation of the generator current to a maximum value is dependent on the instantaneous value of the exciter current. It is therefore necessary to derive the limit value for the generator current from the exciter current. To that end, the current actual value of the exciter current must be supplied to the limiter. FIG. 4 shows one example of a controller for the step-up converter.

The subsidiary controller for the step-up converter comprises a first PI controller 81, a current limiter 83 and a second Pi controller 85 connected in series with each other, The difference between the set-point voltage (41.5 V) and the actual output voltage is supplied to the first Pi controller 81. The output of the first Pi controller 81 is fed to the current limiter 83. The generator current is subtracted at 87 from the output of the current limiter 83 and the result is fed to the second Pi controller 85 which generates a PWM ratio signal for the step-up converter.

Overvoltage Protection

The overvoltage protection should intervene as quickly as possible, to suppress overvoltage peaks. The rate of increase of the output voltage is determined by the magnitude of the load drop, or of the current, and the output capacitance. To make it possible to react quickly to overvoltages, a simple P controller is provided. This controller responds as soon as the system voltage exceeds a certain maximum value. If this controller responds, then via the step-up converter the system voltage is controlled to this value. Thus the output power of the generator to the system can be reduced. One possible embodiment for the overvoltage protection is shown in FIG. 5.

Essential Points

For a maximum power output (tangent line), control to the output current of the machine is performed.

For other power levels, the duty factor is reduced until the desired power level is established. The exciter current is controlled to its maximum value. As a result, the stator current of the machine becomes as slight as possible, and the efficiency achieves its most favorable value.

In the event of overvoltages in the system, the machine is short-circuited via the switch, and the power output of the generator is discontinued. This results in load dump protection. Once again, control to a certain predeterminable power output of the generator can be accomplished.

What is claimed is:

1. A method of controlling a generator with an exciter coil and an associated voltage converter, said voltage converter operating as a step-up converter, said method comprising the steps of:
   a) performing a first control process for controlling the generator when an output voltage ($U_{ist}$) of the generator is below a normal operating voltage range ($U_{soll}-\Delta U_{min}$ to $U_{soll}+\Delta U_{max}$), said first control process comprising increasing an exciter current flowing through the exciter coil until said output voltage is in said normal operating voltage range or increasing said exciter current until said exciter current reaches a maximum exciter current value and then increasing said output voltage with the help of said step-up converter until said output voltage is in said normal operating voltage range, so that an output power of said generator is maximum;
   b) performing a second control process for controlling the generator when said output voltage ($U_{ist}$) is within said normal operating voltage range ($U_{soll}-\Delta U_{min}$ to $U_{soll}+\Delta U_{max}$), said second control process comprising clocking said exciter current to regulate said output power of said generator; and
   c) performing a third control process for controlling the generator when said output voltage ($U_{ist}$) exceeds said normal operating voltage range ($U_{soll}-\Delta U_{min}$ to $U_{soll}+\Delta U_{max}$), said third control process comprising limiting said output voltage by means of a P controller via said step-up converter in response to an overvoltage condition.

2. The method as defined in claim 1, wherein said generator is controlled so that said output voltage is approximately 14 V and a step-up converter output voltage is approximately 42 V, regardless of generator rpm.

3. The method as defined in claim 1, wherein said output voltage is controlled by adjusting a duty factor of the step-up converter, and said duty factor determines a ratio of voltage at an output of the step-up converter to voltage at an input of the step-up converter.

4. The method as defined in claim 1, wherein said generator and said voltage converter are part of an on-board vehicle electrical system.

5. A device for controlling a generator with an exciter coil and with an associated voltage converter, said voltage converter operating as a step-up converter, said device comprising:

means for performing a first control process for controlling the generator when an output voltage ($U_{ist}$) of the generator is below a normal operating voltage range ($U_{soll}-\Delta U_{min}$ to $U_{sol}+\Delta U_{max}$), said first control process comprising increasing an exciter current flowing through the exciter coil until said output voltage is in said normal operating voltage range or increasing said exciter current until said exciter current reaches a maximum current value and then increasing said output voltage with the help of said step-up converter until said output voltage is in said normal operating voltage range, so that an output power of said generator is maximum;

means for performing a second control process for controlling the generator when said output voltage ($U_{ist}$) is within said normal operating voltage range ($U_{soll}-\Delta U_{min}$ to $U_{soll}+\Delta U_{max}$), said second control process comprising clocking said exciter current to regulate said output power of said generator; and means for performing a third control process for controlling the generator when said output voltage ($U_{ist}$) exceeds said normal operating voltage range ($U_{soll}-\Delta U_{min}$ to $U_{soll}+\Delta U_{max}$), said third control process comprising limiting said output voltage by means of a P controller via said step-up converter in response to an overvoltage condition.

6. A device for controlling a generator including an exciter coil and supplying a load; said device comprising a voltage converter for converting generator output voltage connected with said generator, said voltage converter operating as a step-up converter;

a controller for controlling an exciter current flowing through said exciter coil of said generator;

a subsidiary controller for controlling said step-up converter;

wherein said subsidiary controller and said controller for controlling said exciter current are connected with each other for exchange of information and either said subsidiary controller or said controller for controlling said exciter current controls said output voltage ($U_{ist}$) of said generator according to a value of said output voltage of said generator.

7. The device as defined in claim 6, wherein said controller for controlling said exciter current acts to increase said exciter current when said output voltage is below a normal operating voltage range ($U_{soll}-\Delta U_{min}$ to $U_{soll}+\Delta U_{max}$) until said output voltage is in said normal operating voltage range or until said exciter current reaches a maximum current value.

8. The device as defined in claim 6, wherein said subsidiary controller acts to limit said output voltage when said output voltage is above said normal operating voltage range.

9. The device as defined in claim 6 or 8, wherein said subsidiary controller comprises a P controller response to an overvoltage condition to generate control signals to active the step-up converter to reduce said output voltage.

10. The device as defined in claim 6, wherein said step-up controller comprises means for controlling a terminal voltage of said generator by changing a duty factor of said step-up converter, and said duty factor determines a ratio of voltage at an output of said step-up converter and voltage at an input of said step-up converter.

* * * * *